US00RE36306E

United States Patent [19]

Gundjian

[11] E Patent Number: Re. 36,306

[45] Reissued Date of Patent: Sep. 14, 1999

[54] METHOD FOR PROTECTING AGAINST DUPLICATION WITH A COLOR COPIER

[75] Inventor: Arshavir Gundjian, Montreal, Canada

[73] Assignee: Nocopi Technologies, Inc., Wayne, Pa.

[21] Appl. No.: 08/491,423

[22] Filed: Jun. 16, 1995

Related U.S. Patent Documents

Reissue of:

[64] Patent No.: 5,354,723
Issued: Oct. 11, 1994
Appl. No.: 08/049,748
Filed: Apr. 19, 1993

U.S. Applications:

[63] Continuation-in-part of application No. 07/861,712, Apr. 1, 1992, Pat. No. 5,338,066.

[51] Int. Cl.[6] ..... B41M 5/20; B42D 15/00

[52] U.S. Cl. ..... 503/201; 503/206; 503/207; 283/67; 283/95; 283/902; 428/207; 428/333; 428/531; 428/915; 428/916

[58] Field of Search ..... 503/201, 206, 503/207; 283/95, 67, 902; 428/915, 916, 207, 333, 531

[56] References Cited

U.S. PATENT DOCUMENTS

| | | | |
|---|---|---|---|
| 4,629,630 | 12/1986 | Devrient | 283/95 |
| 4,846,502 | 7/1989 | Chang | 283/95 |
| 5,058,925 | 10/1991 | Dotson | 283/95 |
| 5,209,515 | 5/1993 | Dotson et al. | 283/95 |

*Primary Examiner*—Stevan A. Resan
*Attorney, Agent, or Firm*—Sprung Kramer Schaeffer & Briscoe

[57] ABSTRACT

A method for protecting against duplication of a document with a color copier comprises providing a background color on a document having an average reflectance value and printing on the background with a contrast color having a spectral characteristic which modulates the average reflectance value by no more than 5% and has an average value equal to the average reflectance value. The contrast color is printed with a printing medium that allows activation by a rub and reveal action or by application of intense light.

20 Claims, 2 Drawing Sheets

100
90
84
80
76
70
63
60
57
50
40
31.5
30
28.5
20
10
REFLECTANCE %
CASE I
11
Av(80)
41
42
12
CASE II
21
Av(60)
51
22
52
CASE III
31
Av(30)
61
32
62
400
450
500
550
600
650
WAVELENGTH (nanoseconds)

METHOD FOR PROTECTING AGAINST DUPLICATION WITH A COLOR COPIER

Matter enclosed in heavy brackets [ ] appears in the original patent but forms no part of this reissue specification; matter printed in italics indicates the additions made by reissue.

This application is a *Reissue of Ser. No. 08/049,748 now U.S. Pat. No. 5,354,723 which is a* continuation-in-part application of U.S. application Ser. No. 07/861,712, filed Apr. 1, 1992 [and still pending] *now U.S. Pat. No. 5,338, 066.*

BACKGROUND OF THE INVENTION

The advent of color copiers and the tremendous improvements recently achieved in the visual quality of copies produced by such photocopiers has opened up a new area of major concern in the fight against the fraudulent duplication and counterfeiting of valuable documents.

The almost daily reported cases of fraudulently color copied admission tickets to major events, securities and high face value redeemable coupons are only a few examples of a very large problem.

The prior art provides a technology where the background of an original document is printed by a complex combination of multicolor screens where a statement such as VOID or COPY is "hidden" to the casual visual scrutiny and upon copying, the screens that carry the hidden words become more prominent and hence the latter become visible to reveal the copied nature of the document. It is important to note that the prior art relies on the "revelation" of "hidden" information. This has an inherent weakness which results from the obvious ease with which the "revealed" information can always be erased or inhibited through successive copying. As a matter of fact it is currently known in the printing trade that, while on the one hand the successful provision of a "Standard Register" prescribed background on the original is rather difficult, on the other hand the inhibition of the revealable messages on the copy is relatively easy.

As distinctly opposed to the above described situation, the present invention consists of placing on the original document, through any one of the presently known printing processes, background information which is visually perceptible and readable to a greater or a lesser degree, but which upon color copying will be washed away thus alarming the user by its absence.

SUMMARY OF THE INVENTION

The present invention provides a relatively simple, but most importantly, a very effective technology that results in a radical solution to this problem.

Furthermore, this technology is completely compatible with all known printing systems and is, therefore, particularly suitable for the protection of original documents, labels and other printed vehicles against duplication on color copiers.

The central concept of this invention is to impart to the background of a document a carefully specified optochemical dual characteristic of which evidently neither the optical nor the chemical components can be duplicated by a color copier. Actually, the very high security provided by this technique consists of the fact that when the operator fraudulently using the color copier tries to obtain at best a visual duplication of the document, the presently disclosed technique will render the copy easily identified by a legitimate examiner and hence will induce the latter to proceed to a simple verification step using a simple chemical, mechanical or optical action, where the fraudulent copy will invariably fail, since the copier is naturally incapable of reproducing any chemical or photochemical feature from the original.

These and other objects and advantages are achieved in accordance with the present invention by a method for protecting against duplication of a document with a color copier, comprising as a first condition the provision of a background color on a document having a uniform reflectance of a given average reflectance value and printing information or a message on the background with a contrast color having a spectral characteristic which modulates the average reflectance value by no more than 5% and which also has an average value essentially equal to the average reflectance value of the background. The step of printing the contrast color comprises further applying a printing medium including in one instance a mixture of micronized color former leuco dye, a micronized activator, such as an activator phenolic resin or an activator bisphenol or an activator hydroxybenzoate and a binder and the verification method further comprises thereafter activating the color former leuco dye and the activating phenolic resin or other micronized activator to change the original color of the printing medium by simultaneously applying localized mechanical pressure and a rubbing action on the printing medium. Alternatively, printing the contrast color comprises applying a printing medium including one of micronized color former leuco dye and a micronized activator, such as an activator phenolic resin, covering the printing medium with a first colorless continuous coating of a barrier material and covering the continuous coating with a second continuous coating of the proper contrast color of the other of a micronized color former leuco dye and micronized activator, such as an activator phenolic resin and the verification method further comprises activating the color former leuco dye and the activating phenolic resin to change the color of the printing medium by simultaneously applying localized mechanical pressure sufficient to break the barrier coating and a rubbing action on the printing medium.

In another embodiment, printing the contrast color comprises applying a printing medium including a mixture of micronized color former leuco dye and a micronized activator where one or both of such micronized materials is encapsulated in microcapsules of which the walls constitute a proper barrier material as described later and the verification method further comprises activating the color former leuco dye and the activating phenolic resin or other micronized activator material to change the color of the printing medium by simultaneously applying a localized mechanical pressure sufficient to break the walls of the microcapsules and a rubbing action on the printing medium.

In a further embodiment, printing comprises applying a printing medium with the proper contrast color but also including a microencapsulated photochromic dye only sensitive to intense radiation and the verification method further comprises activating the photochromic dye to change the color of the printing medium.

The present invention will be discussed with reference to the attached drawing wherein:

DETAILED DESCRIPTION OF THE INVENTION

The objective of the present invention is to tailor the optical characteristics such that they appear as visually identifiable elements on the original document and that they then disappear or at best, are completely distorted after color copying and hence through their absence or visual distortion reveal that a copying process has taken place. In addition, a chemically, mechanically or radiation activated verification mechanism is integrated into the original document.

A color copier reproduces the colored information from a document by identifying the spectral components of the image pixel to be duplicated and by reproducing as closely as possible the same spectral components on the copy paper by mixing proportionated quantities of colored toners, or in other cases, color developers, that will result in a reasonable replica of the original color.

The present invention takes advantage of the substantial difference in the dynamic range of the copier considered as a sensor of spectral characteristics compared to the human eye. Specifically, it can be observed that while the human eye can easily discern a =(2 to 5)% modulation in the spectral reflection characteristic of a substrate, the color copiers dynamic range sensitivity is substantially less than half of the above range, thus, up to about a 10% total variation in the spectral characteristic is averaged out to zero by the copier.

Figure 1:
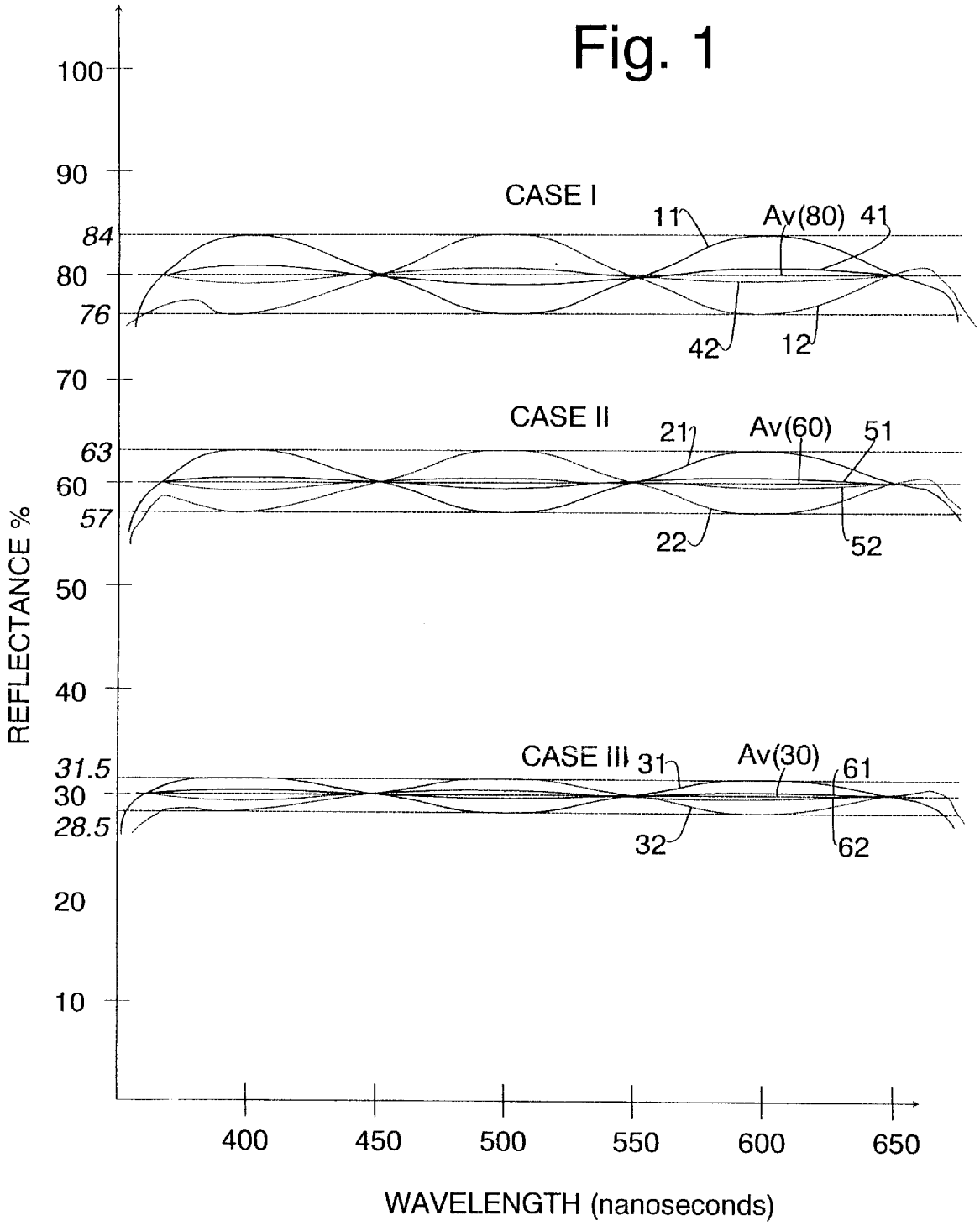
FIG. 1 is a graph of the optical characteristics of the present invention.

The present invention, therefore, prescribes the color of the copy vanishing information to be as shown in FIG. 1. Three different cases are described in FIG. 1. In each case, an average reflectance (Av), corresponds to the prescribed overall uniform reflectance of the background of the original document. Thus, in case I, Av(80) corresponds to an essentially white general background color; in case II, Av(60) corresponds to a perceptibly grey background color; and in case III, Av(30) corresponds to a relatively dark grey background color.

The information to be printed on the above described backgrounds has a spectral characteristic in each case given typically by the curves 11, 12, 21, 22 and 31, 32. Actually any spectral characteristic that modulates the chosen average with a modulation amplitude that is within 5% of the average (Av), can be adopted. These characteristics will actually visually correspond to describable shades. Thus as in case I, the general impression left by 12 will be a light green, the impression left by 11 will be a light pink or purple. Other modulations within 5% (between 76 to 84%) would result in light brown, yellow, etc. colors. In case II, the general background is a light grey and the impression left by 22, 21 and other modulations of the average within 5% (between 57 to 63%) will be a slightly green shaded grey, pink or purple shaded grey, brown shaded grey, etc. In case III, the general background is a dark grey and the impression left by 32, 31 and other modulations of the average within 5% (between 28.5 to 31.5%) will be a very slightly green shaded or a very slightly purple shaded grey.

An obvious limiting case of this invention is when the modulation depth is reduced down to very small values of practically 0% as shown in curves 41, 42, 51, 52, 61, 62 in FIG. 1. In that case, the printed information is hardly visible and even actually practically invisible in a casual inspection and therefore very securely uncopiable. In these cases, the presence of the verification mechanism be it chemical, optical or mechanical, described hereinafter can vividly bring out the information wherever required.

The key element in every one of the above described cases is to ensure that the average reflectance of the general background and the average of the modulation shade are practically equal. Notice, therefore, that while in case I the information is essentially printed over an essentially white background, in cases II and III it is necessary to separately print the background and the information with proper relative registering. Indeed, it is quite obvious that when the average reflectivity is less than around 80%, i.e. the background is grey, any straight overprinting of the modulating color will result in an average reflectance lower than the background reflectance which is not acceptable in this process. A further observation is that since the allowed depth of modulation of the average is a maximum of 5% of the average, it is clear that the visual contrast of colors 11 or 12, 21 or 22 and 31 or 32 against the respective backgrounds, will be less and less as the average goes lower, e.g. the contrast of colors such as 11 or 12 against the background is stronger due to the higher value of the average reflectance.

Now when a document prepared according to the above prescription is placed on a color copier, it is clear that because of the limited dynamic range of the machine, colors 11, 12, 21, 22, 31 and 32 will be reproduced only as their average value, which being coincident with the background reflectance, the copy will show an essentially zero contrast between the copy of the general background and the copy of the information carrying portions of the original that are printed using colors 11, 12, 21, 22, 31 and 32. The copy will thus result in a quasi-uniform reflectance across the board, whereby the information carried on the original will have vanished on the copy.

As a further observation, we note that among the three cases I, II and III, in case I, the color contrast for 11 and 12 relative to the background is the strongest on the original and the printing process is the simplest as well, since 11 and 12 can be printed over an essentially white background. The contrast of the information on the original decreases as we move to the configurations of case II and case III.

The optical characteristic of the original document having been determined as per the prescription given above, it is pretty well guaranteed that the color copy will essentially result in a blank. However, I have considered the possibility of having in the worst case some traces of the original information picked up by the copier due to a deviation in the modulation depth of the spectral characteristics of the original from the range prescribed by the present invention or a particularly strong response in some photocopies with respect to a given color shade. I have thus considered that a second special property unrelated to color and therefore, unreproducible characteristic should be imparted to the original. This is chosen to be a special chemical or photochemical characteristic. Thus, when the photocopy shows a relatively easily perceptible visual deviation from the original document, a final and definitive chemical, mechanical or photochemical verification is performed on the suspected copy. The copy will undoubtedly fail to respond to this verification process and thereby the latter allows the clear identification of the original from the copy.

The chemical, mechanical or photochemical characteristic utilized for the identification of the original must be easily conveyed to the inks used in the printing of the original document, and also it must be easily verified as being present on the original and absent on the copy.

In accordance with the invention, as one mode of identification of the original, I have chosen to introduce in the printing medium, for example printing inks, a small percentage, typically 2 to 10% of either a color former leuco dye or an activator such as a phenolic resin, a bisphenol or a hydroxybenzoate which can be dissolved in the solvent vehicle or suspended in water based inks and thus be conveyed to the printed information portions of the original document. Clearly the color copied document will contain no trace of such chemicals. The chemical verification process consists of applying to the document the complimentary chemical, i.e. when the printing ink contains the activator, the verification is performed with a color former leuco dye carrying applicator. On the other hand, when the printing ink is prepared with the addition of a color former, the verification is performed with an activator carrying applicator. Examples of such leuco dyes are: Copikem 14, Copikem Magenta, Copikem 6, Copikem 4 made by Hilton-Davis, Pergascript Orange I-5R, Pergascript Red I-6B, Pergascript Green I-3G, Pergascript Yellow I-3R made by Ciga-Geigy, Reakt Red 448, Reakt Yellow 186 made by BASF, either alone or in combination.

Examples of such activating phenolic resins are: zincated, modified alkyphenol activator HRJ-10138; the Alkylphenol Novolac resin activator HRJ-2609 as made by Schenectady Chemicals Inc.; the chemical zinc chloride $ZnCl_2$, some bisphenols and hydroxybenzoates either alone or in combination.

The verification process will result in a highly visible color change of the information portion when color former leuco dyes meet the activator on the original, while in the fraudulent copy, the application of either a leuco dye or the activator through an applicator will leave the copy inert.

Other reactive pairs of chemicals can be chosen as well with one of the pair inserted in the ink while the other is used for verification.

After the substrate, such as paper or the like, is chosen and has the proper background color and the message to be prevented from color copying is printed using the prescribed contrast colors, other textual matter can be printed thereon in another ordinary color such as black.

In use, if the substrate has been duplicated in a color copier, there will be a clear indication of this copying, due to the fact that the message printed with the proper contrast colors will have disappeared, since the contrast between the contrast color and the background color will have been reduced to zero on the copy. The user can verify that the copy is not an original by the second step of the chemical verification as described above. It is clear that other types of verification as a second step can be used within the context of the present invention as discussed below.

Indeed, the verification system described above clearly requires the availability of a chemical which causes a reaction with the other of a leuco dye or activator pair which is already imbedded in the ink. It has been found that while this system is very adequate and acceptable in many situations, in other cases it is preferred to make the verification process independent from the availability of a special chemical. In accordance with the invention, a number of other methods have therefore been devised for verification.

In one embodiment, the leuco dye and activator components (referred hereinafter as chemicals A and B) are physically mixed in the printing ink while they are chemically kept separate. This is achieved by one of a number of configurations.

In one case, to achieve the chemical separation, the two chemicals are prevented from being dissolved in a solvent. Instead they are first mechanically micronized into extremely fine submicron sized particles. This submicronization process is fundamentally important in order to allow the integration of these particles into a very smooth ink structure.

In a further embodiment of the invention, the submicronized chemicals A and B are disposed in an aqueous solution containing a small percentage of polyvinyl alcohol or polyvinyl acetate or any other well known binder materials. The sufficient amount of the combination of ordinary ink colorants is then added to the mixture, such that when this combination is used as an ink, for example, in a flexographic printing process, the printed information has a pale visible color characteristic that complies with the requirements described in this disclosure and illustrated by the graphs of FIG. 1. In another embodiment of the invention, the submicronized chemicals A and B can be disposed in a properly chosen offset ink oil base vehicle such as soya oil base offset ink vehicles, where at least one of A or B and preferably both A and B not being soluble, the intimately mixed chemicals A and B do not react. The sufficient amount of the combination of ordinary ink colorants is then added to the mixture such that when this combination is used as an offset ink, for example, the printed information has a pale visible color characteristic that complies with the requirements described in this disclosure and illustrated by the graphs of FIG. 1.

When the print is subjected to a simultaneous mechanical pressure and brisk rubbing action, the micronized particles A and B melt under frictional heat and merge into each other and the color characteristic of their combination is developed, as required by the verification process. This result is achieved with greater or lesser ease depending upon the choice of the activator. For example, submicronized D8 (4-hydroxy 4-isopropoxy diphenyl sulfone) compared to zincated alkylphenol resin lends itself to easier reaction in the leuco dye upon rubbing. This action is coined the "rub and reveal" action. Clearly the above invention can be implemented by extending this concept to a number of other combinations of dispersion vehicles that can keep at least one or better both A and B in an undissolved state, such vehicles are known to those skilled in the field of ink making and related techniques. This invention is meant to cover all such variations.

It has also been found that since, in the embodiment just described, the heat developed during the rubbing process is the triggering stimulant, straight application of heat to the printed document can cause the color change reaction; thus the simple application of heat to the printed document can be used as the verification process. For applications, however, where the sensitivity to heat is found to be a hindrance, the invention includes another embodiment which renders the printed document resistant to reaction by heat up to increasingly higher temperatures as required up to, for example, 350° F. or higher and still provide the "rub and reveal" characteristic. In one implementation of this invention, the two highly submicronized chemicals A and B are separately dispersed in aqueous solutions. In addition, a third colorless water-based printable and neutral varnish such as an acrylic copolymer water-based varnish or a UV curable varnish is prepared as component C. The component C is chosen in order to provide, when applied to any surface, a solvent resistant impermeable coating which furthermore is to have a high softening temperature typically between 210° F. and 400° F. To one of the above aqueous solutions A or B, the visible dyes are added in order to provide the printed color, as prescribed in FIG. 1, and such colored aqueous solutions are called A' or B'.

Figure 2A:
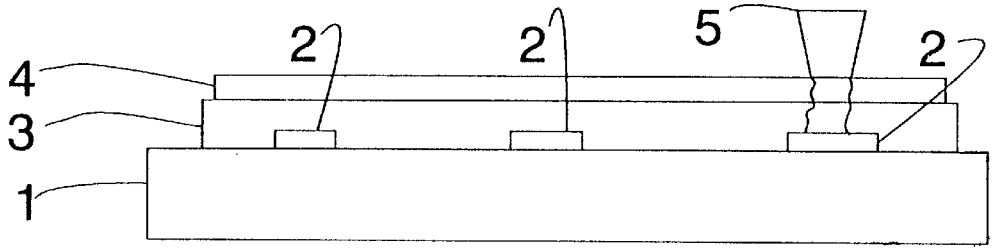
FIGS. 2a, 2b and 2c are side views of substrates formed in accordance with the invention.

One can now implement the invention in one of the two following ways. As shown in FIG. 2a, the information 2 to be protected against color copying is first printed on a substrate 1 using the one ink A' or B'. This printing step is followed by a continuous coating 3 with the waterbased or UV cured varnish C and finally a third coating 4 is added with the aqueous solution containing the other of chemicals B or A in dispersion.

Figure 2B:
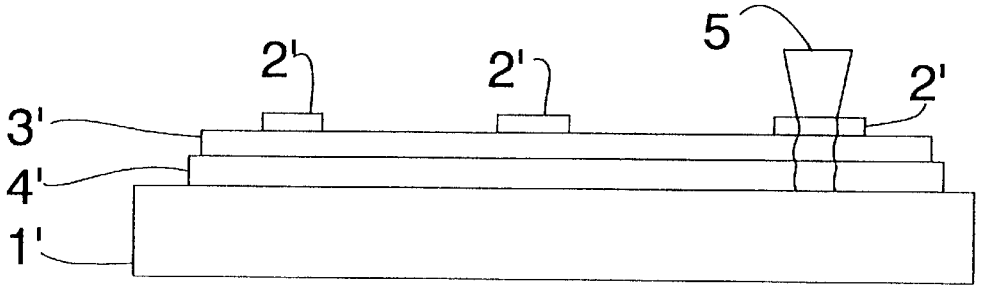

The order of this process can also be completely reversed, as shown in FIG. 2b. In that case, the substrate 1 is first coated with a layer of 4' of one of A or B, then top coated with a layer 3' of the solution C and then finally overprinted with information 2' of the other of B' or A' solution. When the document described in FIG. 2a or FIG. 2b is exposed to heat, the layer 3, 3' will act as a thermal and solvent barrier up to the limiting softening temperature thereof. This can be higher than 210° F. and as high as several hundred degrees. On the other hand, when a strong localized pressure is applied from the top by applicator 5, as shown in FIGS. 2a and 2b, the pressure can easily puncture through all these layers 4, 3, 2, or 2', 3' 4' and when the rubbing is added to the pressure and enough heat is generated, the combination of 4, 2 or 2', 4' takes place with the characteristic color change.

The objective of preventing the activation of the "rub and reveal" systems by the simple application of heat can also be achieved by one of the following embodiments all of which is part of this invention.

Thus, just as well, the submicronized chemicals A and B can be separably dispersed in offset ink vehicles and the whole process of printing in successive steps of first A and then B or the reverse and separating the two steps by the printing of the intermediate layer C and be carried on in an offset printing process. As mentioned above, the isolating varnish layer C can conveniently consist of a UV cured varnish coating which is particularly well suited for impermeability to solvents.

Figure 2C:
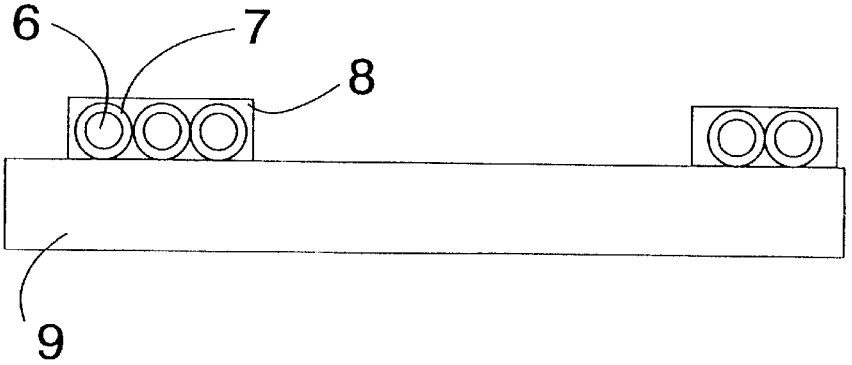

In another embodiment shown in FIG. 2c, the submicronized chemicals A and B are first dispersed in an oil vehicle and then the mixture 6 is encapsulated in microcapsules 7 of which the wall materials provide properties similar to the coating C above, i.e., high softening and melting temperatures as well as impermeability to solvents. In this case the encapsulated submicronized chemicals A and B can be inserted in any one of the non-solvent ink vehicles 8 such as those used in water-base as well as some mild offset ink systems using soya oil as vehicles and printed on substrate 9. Clearly in these cases the solid chemicals A and B will remain perfectly unaffected by heat, until by applying a localized strong mechanical pressure, the microcapsule walls are broken and the chemicals A and B are physically mixed by the further rubbing action that can generate the necessary heat to finally let A and B react and generate the expected reaction color.

Another method of verification in accordance with the invention, which does not require the presence of a chemical carrying pair to activate the printed ink, is the activation by exposure to radiation rather than by exposure to mechanical action. In this case, the verification is caused by the addition to the printing ink of microencapsulated photochromic dyes. Such photochromic dyes can be made sensitive only to intense radiation and very insensitive to exposure to ordinary light, such that only under intense radiation and especially ultraviolet radiation, an appreciable color change takes place. In this case, in order to verify the authenticity of the printed document and when in doubt, the document is exposed to intense light and preferably an ultraviolet light source. The original document will show, within seconds, an appreciable color change, while a fraudulently copied document will remain passive and thus reveal its false nature.

While the invention disclosed above provides a very effective and easily verifiable anticounterfeiting technique against fraud by color copiers. I have extended this invention by the addition of a very simple conjugate component to the printing process that constitutes a main feature added to this invention, since the conjugate component will further discourage the fraudulent copier and will reveal the color copy in an obvious manner.

It is thus considered that the person attempting to fraudulently copy a document protected by the present invention will be induced to try all that is possible to favor in the copying process the perceived colors exhibited by curves 11, 12, 21, 22, 31, 32 of FIG. 1, which as previously described, correspond to light green, pink, purple etc. colors, in order to be able to reproduce the word or message which otherwise would be blocked out in the copying process. I have thus found the remarkable efficiency of adding to the protected document a conjugate printed alarm sounding message such as "Not Valid", "VOID", or any other obvious wording whereby the conjugate element is printed with the same ink and essentially the same prescription as the ones used for the protected message except for the fact that the conjugate element is printed with a modulated spectral characteristic with a modulation depth corresponding to a value close to but higher than the threshold prescribed for safety against color copying. Thus in reference to FIG. 1 a spectral modulation depth slightly above 5% is adopted for the conjugate element. This can easily be achieved by making printing plates such that the conjugate message printing elements of the latter carry somewhat higher densities of ink than the elements that shall print the message prevented from colorcopying.

It is easily visualized that any attempt in colorcopying of the original document where an effort is made to reproduce the main protected message will undoubtedly reproduce even more vividly such conjugate messages as "Not Valid", "VOID" etc. and obliterate the copy.

The final and important step in the addition of the conjugate message to the original document consists in placing such conjugate messages which are still a very pale color, under the text or the graphics of otherwise normally printed components of the document, having thus in view the automatic masking of the conjugate message to the eyes of the reader of the original document. Clearly, however, as described above, when the counterfeiter trying to color copy the original document makes an effort to emphasize the colors of the main message printed according to curves 11, 12, 21, 22, 31, 32 of FIG. 1, he or she will suddenly be faced with the alarm sounding conjugate message which will obviously copy even more readily than the main message.

The invention presented above provides a clearly defined identification process to separate originals from counterfeits. The person skilled in this art can easily develop various ways of implementing this invention, which are considered to be within the scope of the present invention.

What is claimed is:

1. A method for protecting against duplication with a color copier, comprising the steps of:

providing a background color on a substrate having an average reflectance value; and printing on the background color with a contrast color having a spectral characteristic which modulates the average reflectance value by no more than 5% and has an average value equal to the average reflectance value by applying a printing medium *including a binder and further* consisting of a mixture of micronized color former leuco dye and micronized activator material and wherein at least one of the micronized color former leuco dye and activator is non-soluble in the printing medium.

[2. The method according to claim 1, wherein the step of applying a printing medium comprises applying the mixture including a binder.]

3. The method according to claim 1, wherein the step of applying comprises applying an oil based printing ink.

4. The method according to claim 3, wherein the oil based printing ink is an offset printing ink.

5. The method according to claim 1, further comprising activating the color former leuco dye and the activator material to change the color of the printing medium by simultaneously applying mechanical pressure and a rubbing action on the printing medium.

6. A method for protecting against duplication with a color copier, comprising the steps of:

providing a background color on a substrate having an average reflectance value; and printing on the background color with a contrast color having a spectral characteristic which modulates the average reflectance value by applying a printing medium *including a binder and further* consisting of one of micronized color former leuco dye and a micronized activating phenolic resin, covering the printing medium with a first colorless continuous coating of a barrier material providing a non-porous coating of a high softening temperature lying between 210° F. and 400° F. and covering the continuous coating with a second colorless continuous coating of the other of a micronized color former leuco dye and micronized activator material.

7. The method according to claim 6, further comprising activating the color former leuco dye and the activator material to change the color of the printing medium by simultaneously applying mechanical pressure and a rubbing action on the printing medium.

8. A method for protecting against duplication with a color copier, comprising the steps of:

providing a background color on a substrate having an average reflectance value; and printing on the background color with a contrast color having a spectral characteristic which modulates the average reflectance value by applying a first colorless continuous coating of one of micronized color former leuco dye and a micronized activator material, covering the first coating with a second colorless continuous coating of a barrier material providing a non-porous coating of a high softening temperature lying between 210° F. and 400° F. and applying a printing medium *including a binder and further* consisting of the other of micronized color former leuco dye and micronized activating phenolic resin.

9. The method according to claim 8, further comprising activating the color former leuco dye and the activator material to change the color of the printing medium by simultaneously applying mechanical pressure and a rubbing action on the printing medium.

10. A method for protecting against duplication with a color copier, comprising the steps of:

providing a background color on a substrate having an average reflectance value; and printing on the background color with a contrast color having a spectral characteristic which modulates the average reflectance value by applying a printing medium *including a binder and further* consisting of a microencapsulated photochromic dye only sensitive to intense radiation.

11. The method according to claim 10, further comprising activating the photochromic dye to change the color of the printing medium.

12. A method for protecting against duplication with a color copier, comprising the steps of:

providing a background color on a substrate having an average reflectance value; and printing on the background color with a contrast color having a spectral characteristic which modulates the average reflectance value by microencapsulating at least one of a micronized color former leuco dye and a micronized activator material with a colorless continuous coating of a barrier material and applying a printing medium *including a binder and further* consisting of the microcapsules and the other of micronized color former leuco dye and micronized activating phenolic resin.

13. The method according to claim 12, further comprising activating the color former leuco dye and the activator material to change the color of the printing medium by simultaneously applying mechanical pressure and a rubbing action on the printing medium.

14. A method for protecting against duplication with a color copier, comprising the steps of:

providing a background color on a substrate having an average reflectance value; and printing on the background color with a contrast color having a spectral characteristic which modulates the average reflectance value by applying a printing medium *including a binder and further* consisting of a micronized color former leuco dye and a micronized activator material in an oil vehicle and microencapsulated with a colorless continuous coating of a barrier material and wherein the barrier material is non-soluble in the printing medium, nonporous to the oil vehicle and has a softening temperature between 210° and 400° F. and at least one of the micronized color former leuco dye and the micronized activator material are non-soluble in the oil vehicle.

15. The method according to claim 14, further comprising activating the color former leuco dye and the activating phenolic resin to change the color of the printing medium by simultaneously applying mechanical pressure and a rubbing action on the printing medium.

16. A method for protecting against duplication with a color copier, comprising the steps of:

providing a background color on a substrate having an average reflectance value; and printing on the background color with a contrast color having a spectral characteristic which modulates the average reflectance value by no more than 5% and has an average value equal to the average reflectance value to thereby produce unreadable copy when copied and printing on the background a conjugate element having a spectral characteristic which modulates the average reflectance value by at least 5% and has an average value equal to the average reflectance value to thereby produce readable copy when copied.

17. The method according to claim 6, wherein the step of printing the contrast color comprises the steps of printing the contrast color with a spectral characteristic which modulates the average reflectance value by no more than 5% and has an average value equal to the average reflectance value.

18. The method according to claim 8, wherein the step of printing the contrast color comprises the steps of printing the contrast color with a spectral characteristic which modulates the average reflectance value by no more than 5% and has an average value equal to the average reflectance value.

19. The method according to claim 10, wherein the step of printing the contrast color comprises the steps of printing the contrast color with a spectral characteristic which modulates the average reflectance value by no more than 5% and has an average value equal to the average reflectance value.

20. The method according to claim 12, wherein the step of printing the contrast color comprises the steps of printing the contrast color with a spectral characteristic which modulates the average reflectance value by no more than 5% and has an average value equal to the average reflectance value.

21. The method according to claim 14, wherein the step of printing the contrast color comprises the steps of printing the contrast color with a spectral characteristic which modulates the average reflectance value by no more than 5% and has an average value equal to the average reflectance value.

* * * * *